(12) United States Patent
Wang et al.

(10) Patent No.: US 11,847,760 B2
(45) Date of Patent: *Dec. 19, 2023

(54) REMOTE DISTRIBUTION OF NEURAL NETWORKS

(71) Applicant: Snap Inc., Santa Monica, CA (US)

(72) Inventors: Guohui Wang, Los Angeles, CA (US); Sumant Milind Hanumante, Marina Del Rey, CA (US); Ning Xu, Irvine, CA (US); Yuncheng Li, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,764

(22) Filed: Apr. 6, 2022

(65) Prior Publication Data

US 2022/0230277 A1 Jul. 21, 2022

Related U.S. Application Data

(63) Continuation of application No. 16/888,171, filed on May 29, 2020, now Pat. No. 11,315,219, which is a continuation of application No. 15/908,461, filed on Feb. 28, 2018, now Pat. No. 10,713,754.

(51) Int. Cl.
*G06N 3/08* (2023.01)
*G06T 3/40* (2006.01)
*G06N 3/04* (2023.01)
*G06T 1/20* (2006.01)
*G06T 11/60* (2006.01)
*G06N 3/063* (2023.01)

(52) U.S. Cl.
CPC ............. *G06T 3/4046* (2013.01); *G06N 3/04* (2013.01); *G06N 3/063* (2013.01); *G06N 3/08* (2013.01); *G06T 1/20* (2013.01); *G06T 11/60* (2013.01); *G06T 2207/20081* (2013.01)

(58) Field of Classification Search
CPC ......... G06T 3/4046; G06T 1/20; G06T 11/60; G06T 2207/20081; G06N 3/04; G06N 3/063; G06N 3/08
USPC ....................................................... 382/156
See application file for complete search history.

(56) References Cited

U.S. PATENT DOCUMENTS

| 9,607,366 | B1 * | 3/2017 | Brailovskiy | ............ G06T 5/009 |
| 10,713,754 | B1 | 7/2020 | Wang et al. | |
| 2019/0068895 | A1 * | 2/2019 | Hutz | ................. G06F 18/24143 |
| 2019/0228264 | A1 * | 7/2019 | Huang | .................. G06N 3/045 |
| 2020/0294195 | A1 | 9/2020 | Wang et al. | |

OTHER PUBLICATIONS

U.S. Appl. No. 15/908,461 U.S. Pat. No. 10,713,754, filed Feb. 28, 2018, Remote Distribution of Neural Networks.
(Continued)

*Primary Examiner* — Charlotte M Baker
(74) *Attorney, Agent, or Firm* — Schwegman Lundberg & Woessner, P.A.

(57) ABSTRACT

Remote distribution of multiple neural network models to various client devices over a network can be implemented by identifying a native neural network and remotely converting the native neural network to a target neural network based on a given client device operating environment. The native neural network can be configured for execution using efficient parameters, and the target neural network can use less efficient but more precise parameters.

20 Claims, 18 Drawing Sheets

(56) References Cited

OTHER PUBLICATIONS

U.S. Appl. No. 16/888,171, filed May 29, 2020, Remote Distribution of Neural Networks.
"U.S. Appl. No. 15/908,461, Non Final Office Action dated Nov. 22, 2019", 6 pgs.
"U.S. Appl. No. 15/908,461, Notice of Allowance dated Mar. 6, 2020", 7 pgs.
"U.S. Appl. No. 15/908,461, Response filed Feb. 24, 2020 to Non Final Office Action dated Nov. 22, 2019", 9 pgs.
"U.S. Appl. No. 16/888,171, Non Final Office Action dated Sep. 13, 2021", 12 pgs.
"U.S. Appl. No. 16/888,171, Notice of Allowance dated Dec. 24, 2021", 8 pgs.
"U.S. Appl. No. 16/888,171, Response filed Dec. 13, 2021 to Non Final Office Action dated Sep. 13, 2021", 9 pgs.

* cited by examiner

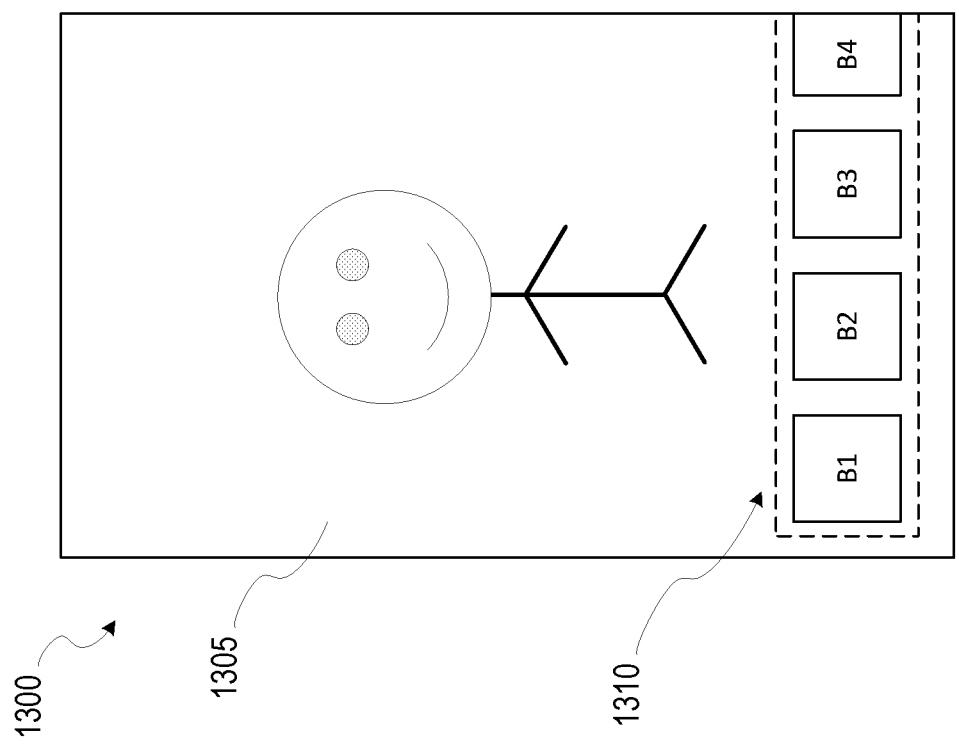

REMOTE DISTRIBUTION OF NEURAL NETWORKS

CROSS-REFERENCE TO RELATED APPLICATION

This application is a continuation of U.S. patent application Ser. No. 16/888,171, filed on May 29, 2020, which is a continuation of U.S. patent application Ser. No. 15/908,461, filed on Feb. 28, 2018, which applications are incorporated herein by reference in their entireties.

TECHNICAL FIELD

The present disclosure generally relates to special-purpose machines that manage machine learning schemes and improvements to such variants, and to the technologies by which such special-purpose machines become improved compared to other special-purpose machines for network distribution of neural networks.

BACKGROUND

Neural networks can be trained for different tasks, such as image processing. A trained neural network model can be transmitted to remote client devices for execution. Different client device types (e.g., different operating systems, screen sizes, processors) often require custom-made neural network models that are specifically designed for execution within a given client device environment. Managing multiple versions of a single neural network model, which then must be sent to different client devices over the network when requested, is difficult and often results in a waste of computational resources. Further, sending all client deices all versions is likewise not practical because client devices often have limited memory.

BRIEF DESCRIPTION OF THE DRAWINGS

To easily identify the discussion of any particular element or act, the most significant digit or digits in a reference number refer to the figure ("FIG.") number in which that element or act is first introduced.

FIG. 13 shows an example user interface for triggering a remote model conversion process, according to some example embodiments.

DETAILED DESCRIPTION

Figure 1:
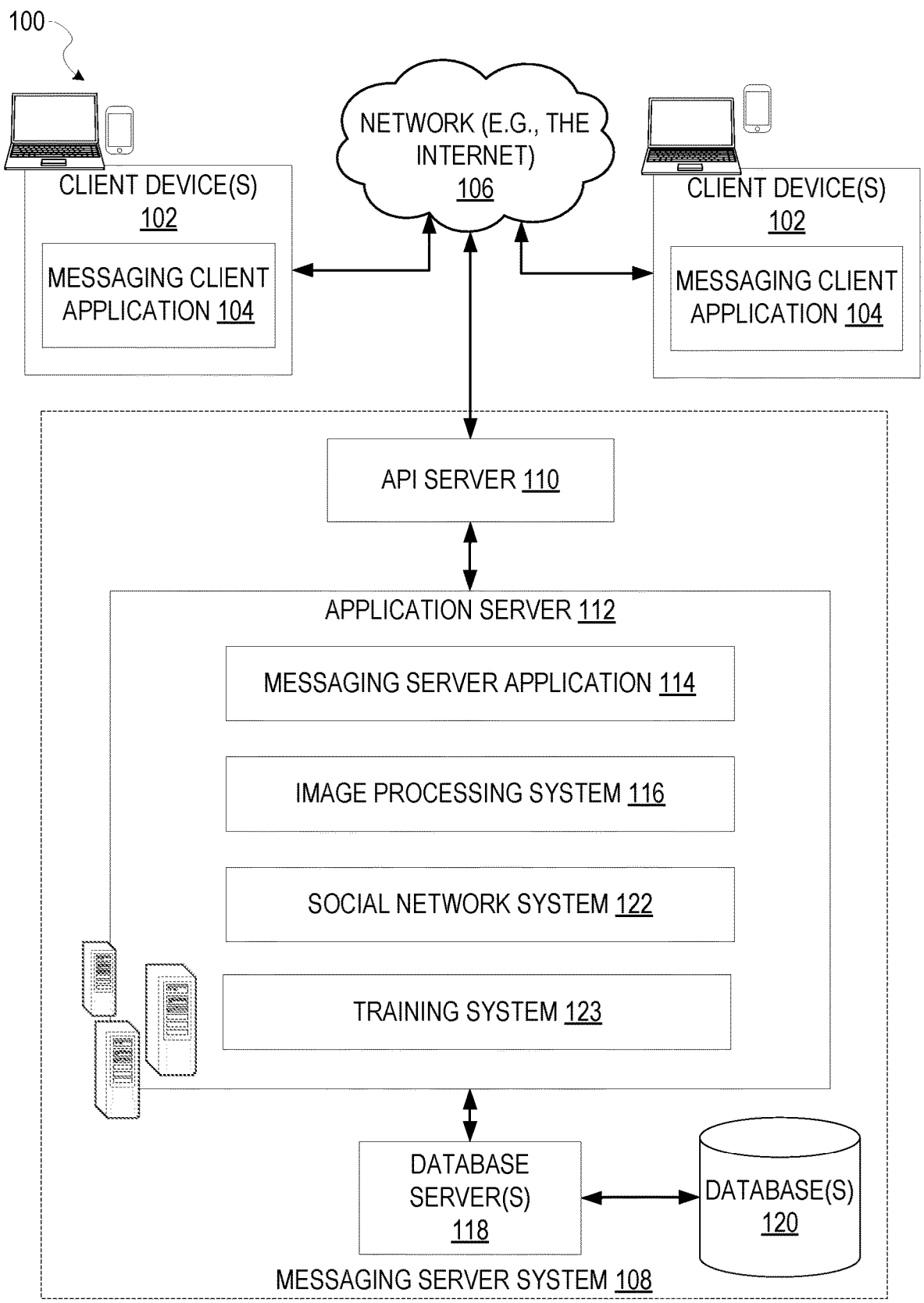
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, neural networks can perform image processing tasks, but distribution of neural network models is problematic. In particular, sending models built for a specific operating environment of a client device can waste network bandwidth. Further, storing different large-format models on the chance that a user may use them can unnecessarily expend client device memory resources.

To this end, a native neural network (NNN, or "N3") model can be trained for execution in an application. Different N3 models can be trained for different tasks, such as image style domain transfer, image segmentation, object classification; as well as non-image-related neural net tasks, such as natural language processing (e.g., using bidirectional long short-term memory (LSTM) neural networks).

One or more of the trained N3 models can be integrated and distributed within an application to a plurality of client devices, e.g., laptops, tablets, smartphones, desktops. In some embodiments, the application is distributed with no N3 models included, and the N3 models are retrieved from a server upon the downloaded application being initiated on the client device. The N3 model can be a custom lightweight neural network model based on well-performing architectures, such as AlexNet 2012, as is known in the art.

The N3 models are lightweight in that various parameters have been modified for fast execution using less memory space on the client devices, many of which have limited memory and limited processing power.

The application can include an N3 execution engine that is configured to apply an N3 model to input data using a processor of the client device, such as a central processing unit (CPU), to yield an output image, which then can be stored or published to a network. While the N3 models enable good quality results, larger models often yield higher quality results. Further, some larger models, though they may have a larger computational footprint, can still be executed more quickly than an N3 because the larger models have hardware acceleration support, (e.g., Apple® CoreML).

While the larger models have some advantages, each client device may require a specific larger model format based on the client devices operating system (OS) (e.g., OSX, iOS, Windows, Linux, Android). Further, many client device that have the same OS may have different processors and hardware capabilities. Thus, creating, transmitting, and managing different versions of models can create large overhead and result in wasted server resources, bandwidth, and client-side resources.

To this end, a client device (e.g., an application of the client device) can implement a remote converter system that is configured to receive an N3 model, parse the model into layers and parameters, and create a larger format model based on the computational resources identified in a given client device. For instance, an N3 model can be transmitted to a client device, and a remote converter, in effect, disassembles the N3 model and reassembles it block-by-block into a target neural network (TNN) model that is based on the that specific client device's computational resources (e.g., a GPU, hardware acceleration libraries, multi-core parallel or concurrent processing on a CPU).

Conversion of N3s into larger model formats can be performed when specific neural net tasks are requested by the user of the client device. That is, the larger model formats are created on-the-fly, only when a user requests them. Further, the application or remote converter engine can pre-convert a given N3 model into a larger format when it seems likely that a user may use it. For example, when a user navigates to a certain user interface, the N3 model can be converted to the larger format before a UI option is presented to the user for applying the imaging effect. In this way, when the user is presented with an option (e.g., UI button) to apply an image effect, the larger format model is ready for use. Further, in those example embodiments, the larger format model (or the N3 model) may generate a result using the newly converted model so the user can immediately see the result upon selecting the UI. In this way, user experience is improved because the user does not have to wait for a newer model to download from the server and also does not wait to see the result image. Further, by distribution via remote conversion, network bandwidth and client device resources are saved. Further, by shifting model management to a remote device, versioning of neural net models is greatly improved.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a training system 123, in some example embodiments. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The training system 123 manages training of neural networks for specific tasks, such as image segmentation, image domain style transfer, object classification, natural language processing, audio-based scene identification, etc. The training system 123 may generate trained N3 models for distribution and remote conversion on one or more client devices, as further discussed below.

The application server 112 is communicatively coupled to the database server 118, which facilitates access to the database 120 in which is stored data associated with messages processed by the messaging server application 114.

Figure 2:
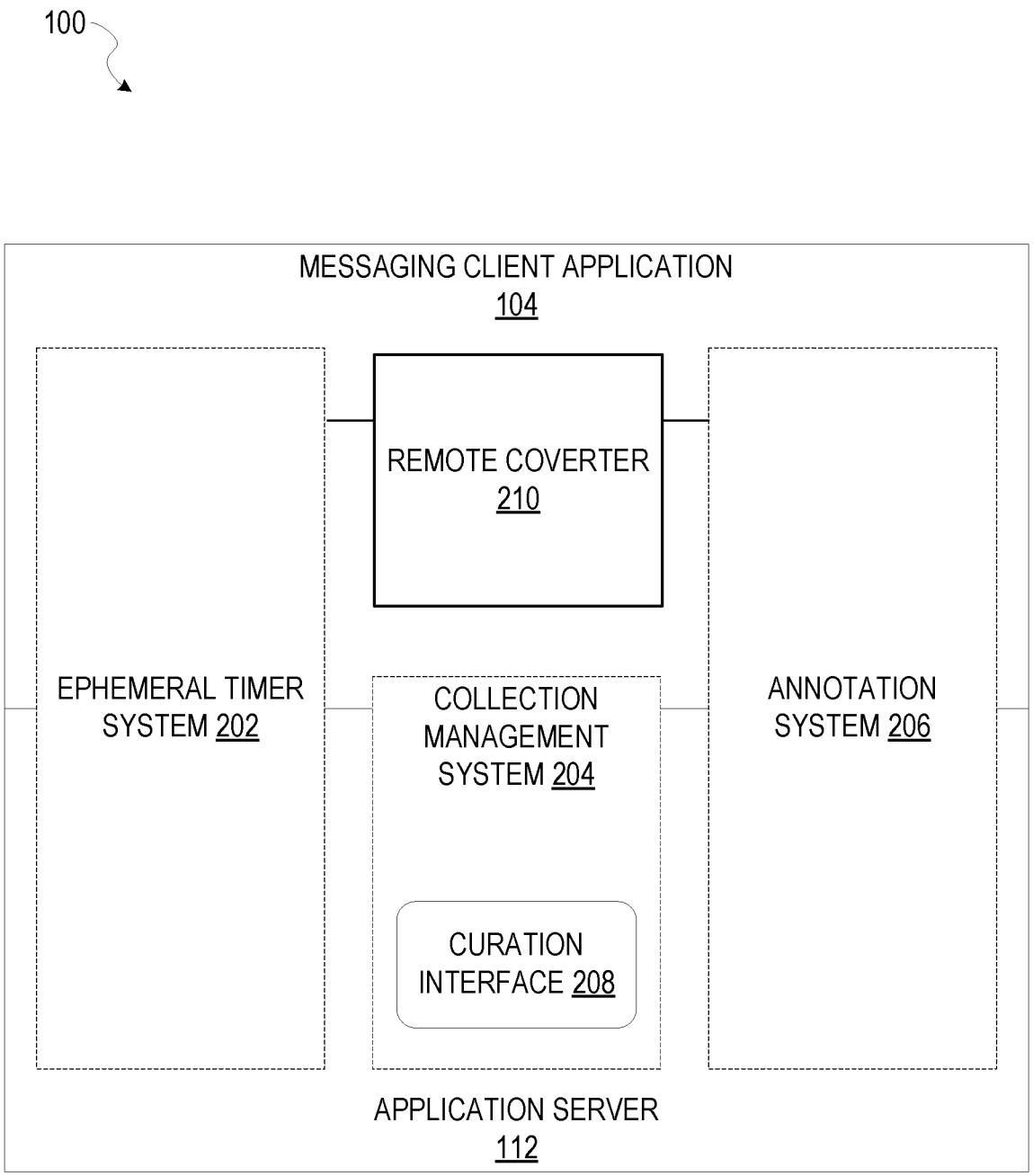
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, a remote converter 210, and a curation interface 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

In some example embodiments, the messaging client application 104 further comprises a remote converter 210, which manages applying N3 models to input images and remote conversion of the N3 models, as discussed in further detail below.

Figure 3:
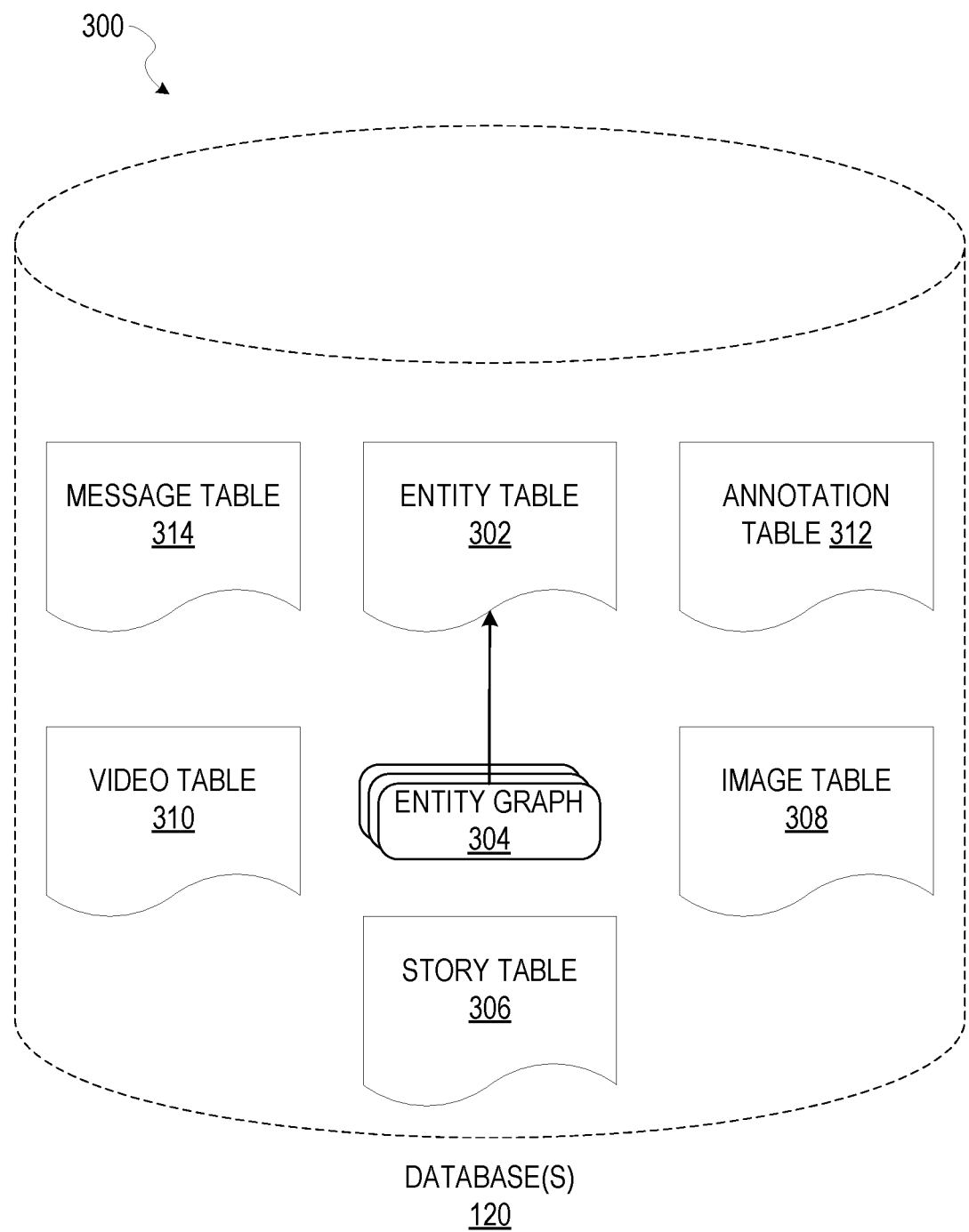
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
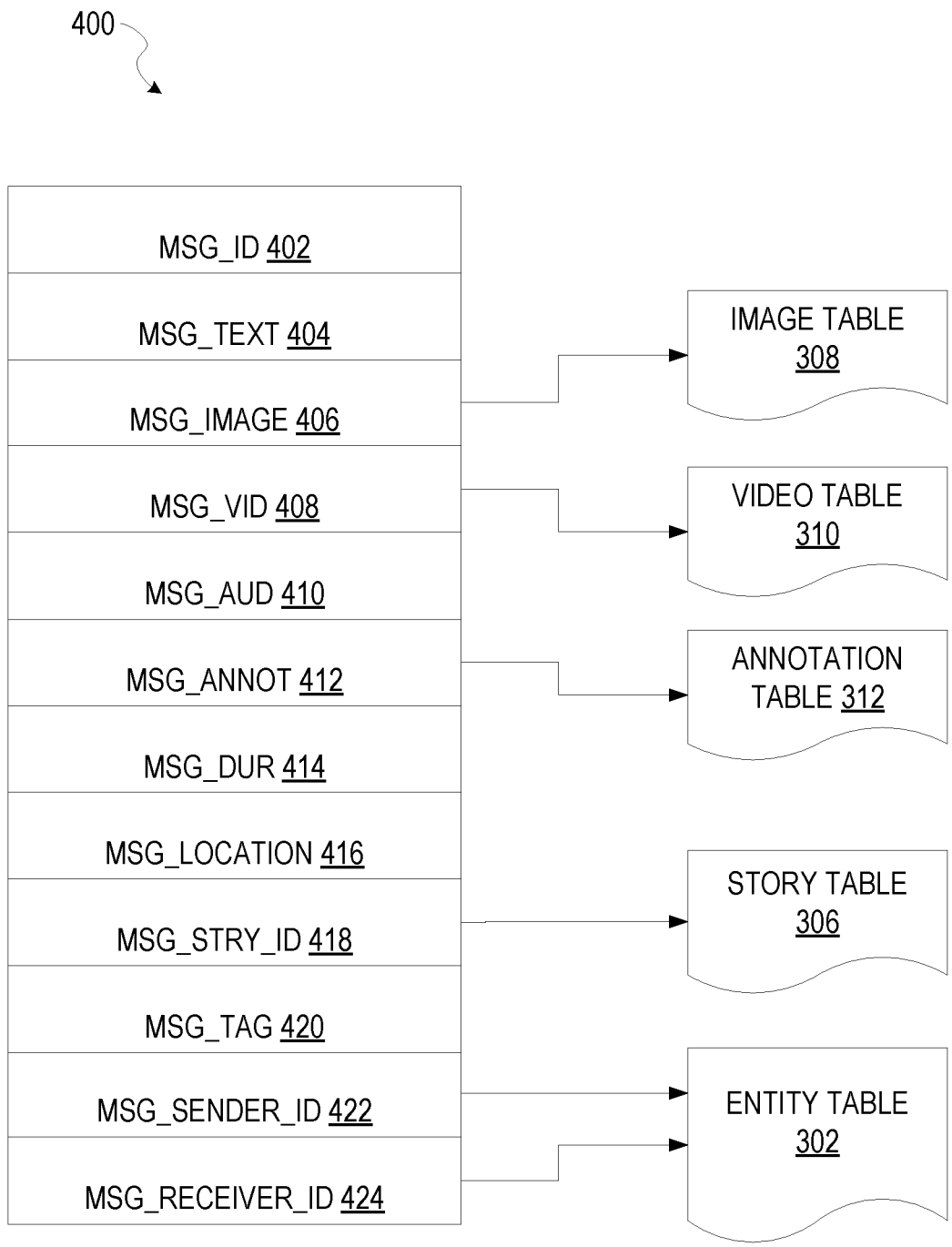
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
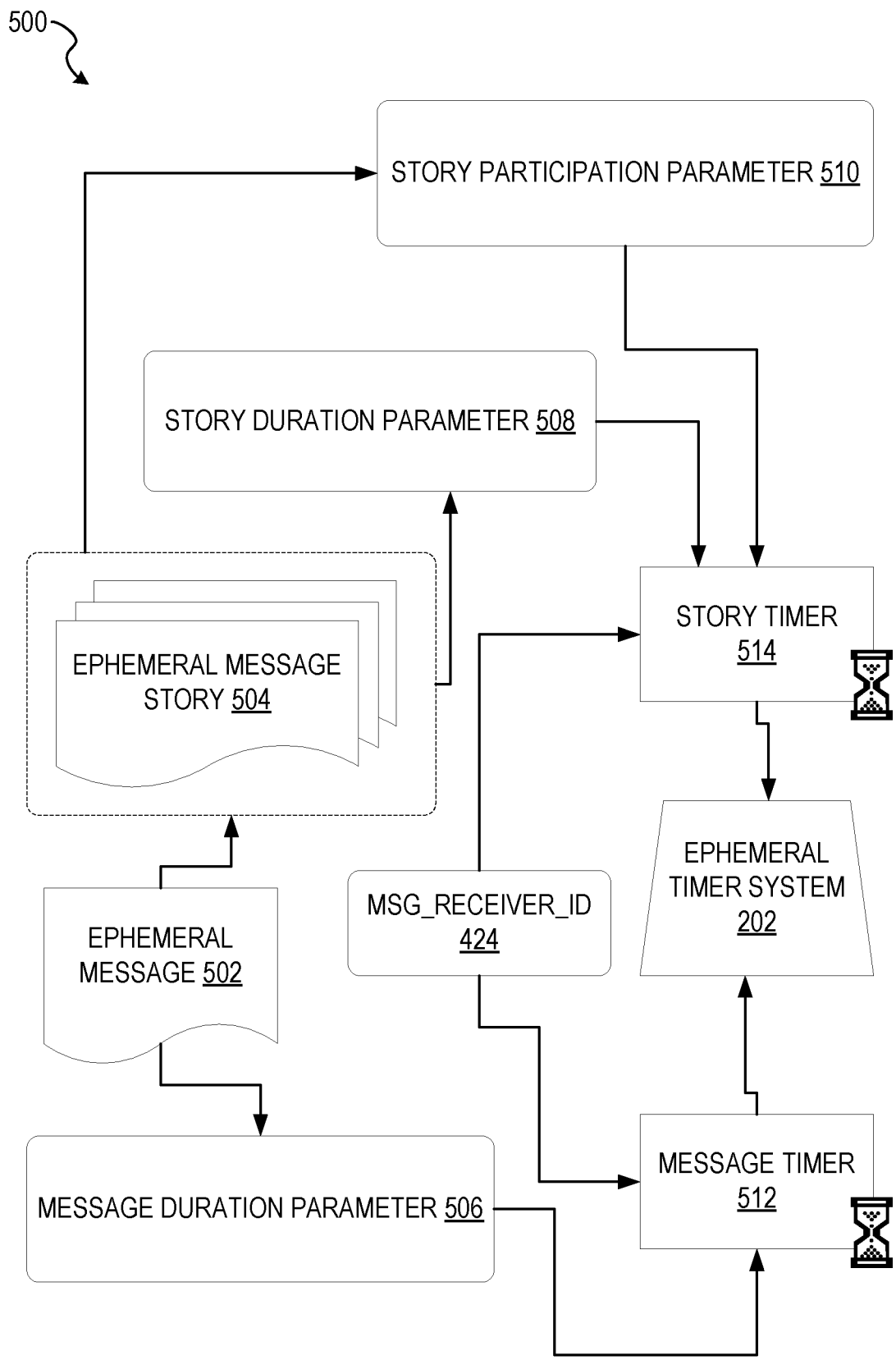
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504. The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring (via the story timer 514) in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
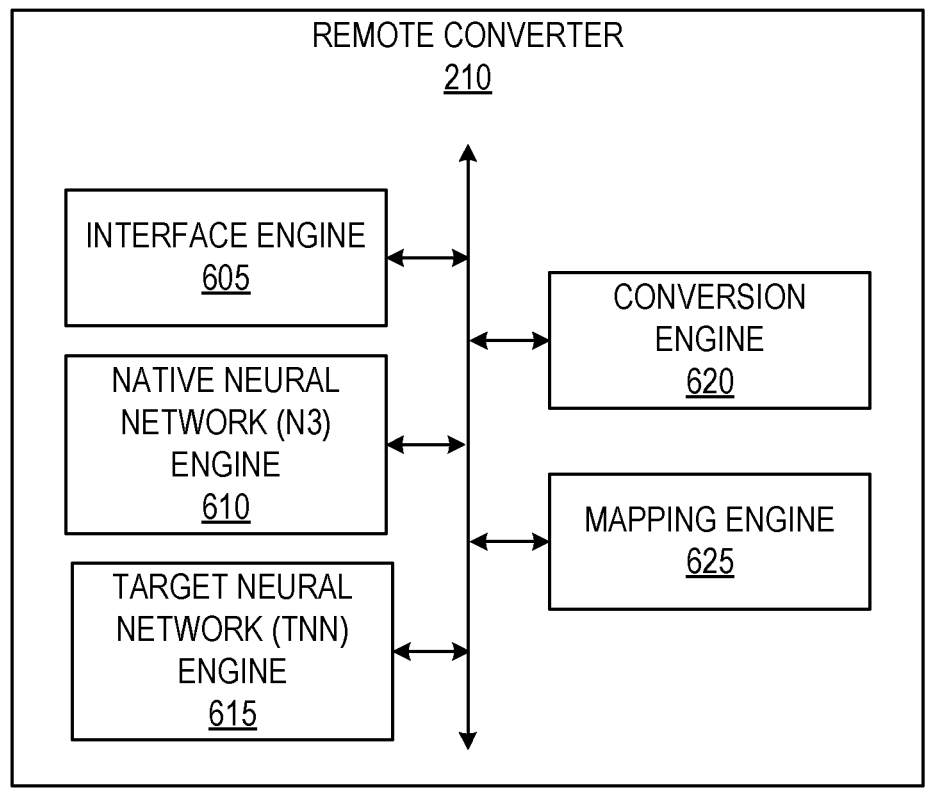
FIG. 6 shows example functional internal components of a remote converter, according to some example embodiments.

FIG. 6 shows example functional internal components of a remote converter 210, according to some example embodiments. As illustrated, the remote converter 210 comprises an interface engine 605, a native neural network (N3) engine 610, a target neural network (TNN) engine 615, a conversion engine 620, and a mapping engine 625. The interface engine 605 manages generation or identification of an input image for modification by one or more neural networks. Further, the interface engine 605 can manage triggering a neural network conversion process in response to a certain application event occurring (e.g., navigation to a pre-specified user interface, upon activation of the messaging client application 104, etc.). The N3 engine 610 is configured to apply a trained N3 model to input data (e.g., an image, an audio file) to generate output data for storage or distribution over a network. The target neural network (TNN) engine 615 is configured to apply remotely generated target neural network (TNN) model to an input data (e.g., an image, an audio file) to generate output data. The conversion engine 620 manages receiving an instruction to convert a specified N3 model to a TNN model, e.g., for application to input data. In some example embodiments, the conversion engine 620 interfaces with other engines of the remote converter 210 using an application programming interface (API) to allow easy programming and distribution of newly configured N3 models. The mapping engine 625 is configured to manage parsing layers and identifying model-specific information of an N3 model and map and convert the parsed information to the format used by the TNN model. In some example embodiments, the mapping engine 625 is integrated within the conversion engine 620. Further in some example embodiments, the mapping engine 625 is a standalone object within the remote converter 210

Figure 7:
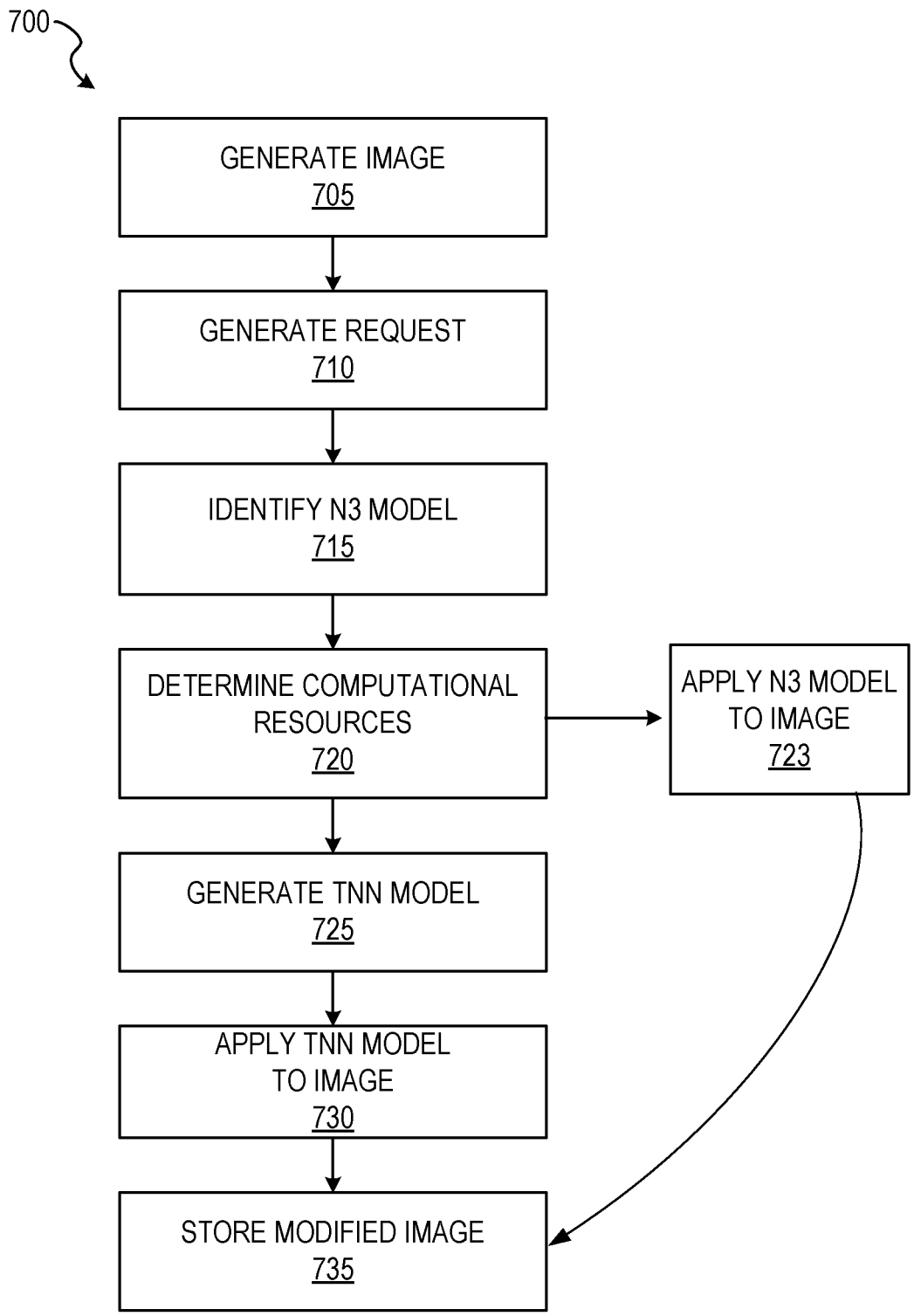
FIG. 7 shows an example flow diagram of a method for implementing remote distribution of neural networks, according to some example embodiments.

FIG. 7 shows an example flow diagram of a method 700 for implementing remote distribution of neural networks, according to some example embodiments. At operation 705, the interface engine 605 generates an image on the client device 102. For example, at operation 705, the interface engine 605 uses an image sensor of the client device 102 to generate an image, and stores the image to local memory of the client device 102. As an additional example, at operation 705, the interface engine 605 identifies an image that has been pre-generated elsewhere (e.g., by another engine in the messaging client application 104, by another application executing on the client device 102, or an image downloaded from a network server). At operation 710, the interface engine 605 generates a request that initiates an image processing task. For example, a user may select a user interface (UI) button to apply an imaging task (e.g., image domain style transfer) to the image generated at operation 705. In response to the request, at operation 715, the interface engine 605 identifies the N3 model configured to perform the requested task. At operation 720, the interface engine 605 determines computational resources of the client device 102. For example, at operation 720, the interface engine 605 may determine a native screen size of the client device 102, bandwidth quality, processor type, GPU availability, and hardware acceleration support.

In some example embodiments, if the client device 102 does not have hardware acceleration support and has limited computational resources, the interface engine 605 generates an instruction for the N3 engine 610 to apply the N3 model. For example, if at operation 720 the interface engine 605 determines that the client device 102 does not have a GPU and/or hardware acceleration support, then at operation 723 the N3 engine 610 applies the N3 model to the input image using the CPU of client device 102. The resulting image can then be stored at operation 735.

Alternatively, if the interface engine 605 determines that the client device 102 has enhanced capabilities for execution of larger format neural network models (e.g., GPU, hardware acceleration platform), the interface engine 605 transmits an instruction to the conversion engine 620 to convert the N3 model for the specified task to a TNN model based on the client device's resources. For example, at operation 720, the interface engine 605 may determine that a hardware acceleration platform (e.g., CoreML) is enabled on the client device 102. In response, the interface engine 605 may generate an instruction that specifies an input N3 model, a TNN model to be generated, and other parameters, such as image size. The instruction is transmitted to an API of the conversion engine 620, which then generates the TNN model in operation 725.

At operation 730, the TNN engine 615 applies the newly generated TNN model to the image to create a modified image. At operation 735, the interface engine 605 stores the modified image in memory and optionally publishes it to a network site as an ephemeral message.

Figure 8:
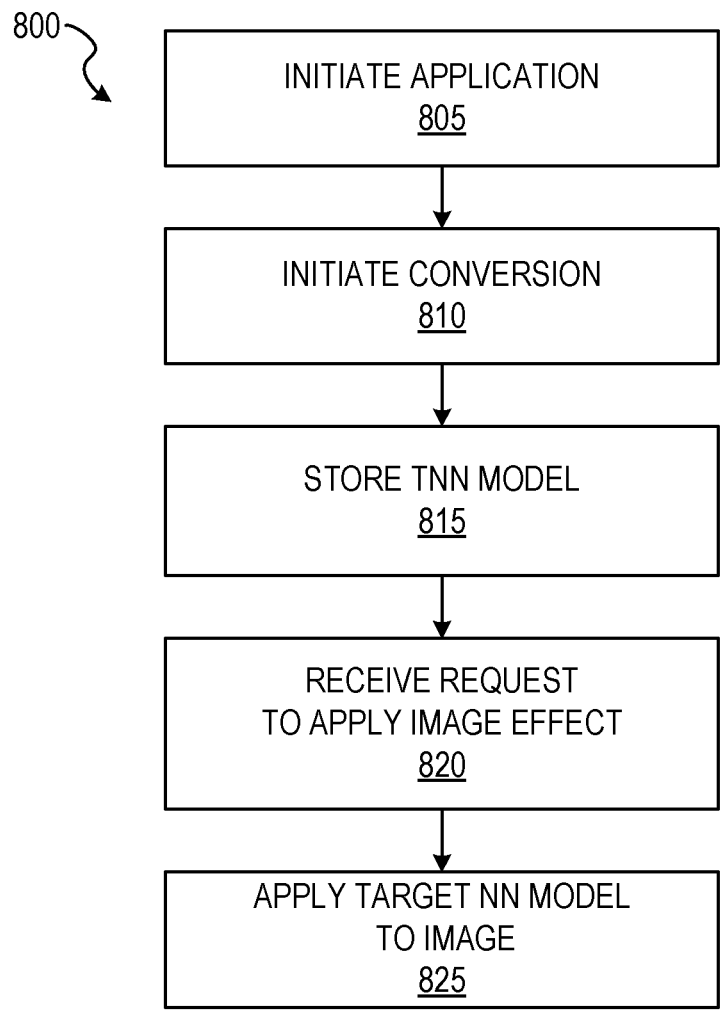
FIG. 8 shows an example flow diagram of a method for implementing remote distribution of neural networks, according to some example embodiments.
Figure 9:
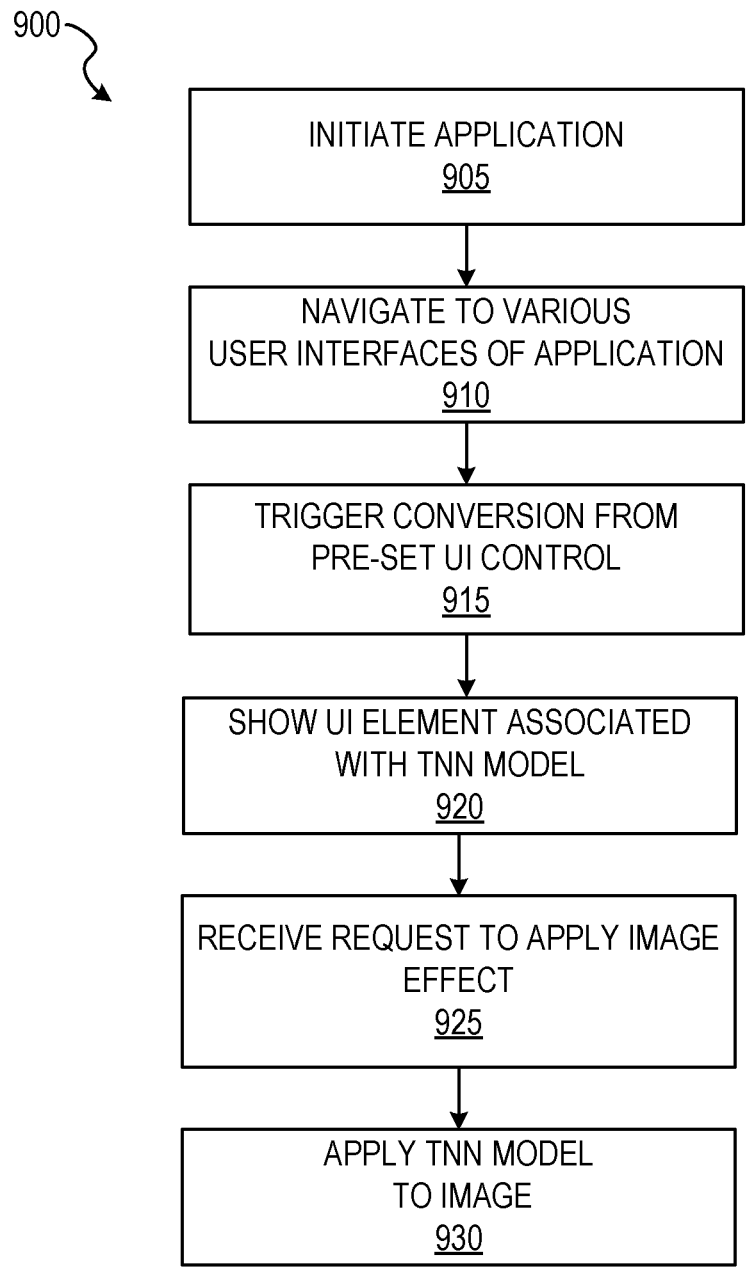
FIG. 9 shows an example flow diagram of a method for implementing remote distribution of neural networks, according to some example embodiments.

As discussed above, by implementing a remote converter 210, larger format neural network models can be generated using on-the-fly conversion. FIGS. 8 and 9 discuss different approaches for initiating conversion in response to different application events occurring.

FIG. 8 shows an example flow diagram of a method 800 for implementing remote distribution of neural networks, according to some example embodiments. In the method 800, the N3 model may have been downloaded with the messaging client application 104. If it is determined that the client device 102 has large memory resources, one or more TNN models that are most frequently used by users can be generated in the background using the example method 800. In some example embodiments, client devices report usage data to the application server 112 and the application server transmits an instruction to the remote converter 210 of which models to convert based on frequency statistics from the usage data.

At operation 805, the operating system (OS) of the client device 102 initiates the messaging client application 104. At operation 810, in response to the messaging client application 104 being made active, the conversion engine 620 initiates conversion of a N3 model to a TNN model as a background process on the client device 102. At operation 815, the conversion engine 620 stores the newly generated target neural network model in memory of the client device 102. Although only one model is discussed here in the example method 800, one of ordinary skill in the art appreciates that multiple models each configured for different tasks may be likewise converted and stored as background processes of the client device 102.

At operation 820, the interface engine 605 receives a request to apply an image effect. The image effect may be a task for which the N3 model and the TNN model are trained. At operation 825, the TNN engine 615 applies the newly generated TNN model to the specified image to generate a modified image, which can then be locally stored and/or distributed over a network as an ephemeral message.

FIG. 9 shows an example flow diagram of a method 900 for implementing remote distribution of neural networks, according to some example embodiments. At operation 905, the operating system of the client device 102 initiates the application, as discussed above. At operation 910, the messaging client application 104 displays various user interfaces in response to the user's navigation inputs. For example, the user may view a primary newsfeed area of the messaging client application 104 and then press an image generation button which allows the user to take a picture of him or herself (e.g., a "selfie"), which can then be displayed on the display device of the client device 102. At operation 915, to a pre-set UI control being activated, a conversion process is initiated which converts one or more N3 models to corresponding TNN models. For example, in response to the picture being displayed on the client device, the conversion engine 620 triggers conversion of the N3 model to the TNN model. In this way, if the user chooses to apply an effect for which the N3/TNN model is trained, the models can immediately be implemented without the user experiencing processing delay. Although in the example of method 900 the trigger event is an image or user interface being displayed, one of ordinary skill in the art appreciates that conversion could be triggered by a navigation path of the user through the messaging client application 104, or other UI-based events such as the scrolling of icons that are configured to initiate different image effects, as discussed in further detail below At operation 920, the interface engine 605 shows a UI element that is configured to apply an image effect for which the N3 model and newly generated TNN model are configured to apply. At operation 925, the interface engine 605 receives a request to apply an image effect to the image. At operation 930, the TNN engine 615 applies the pre-emptively created TNN model to the image to generate a modified image for display and optional publication to the a network. Further, according to some example embodiments, both the TNN model and the modified image are pre-generated before the user has an option to view the image effect. In this way, when the user selects the UI button to view the modified image, the modified image is immediately displayed to the user without having to wait for the TNN model to be created or downloaded from the network.

Figure 10:
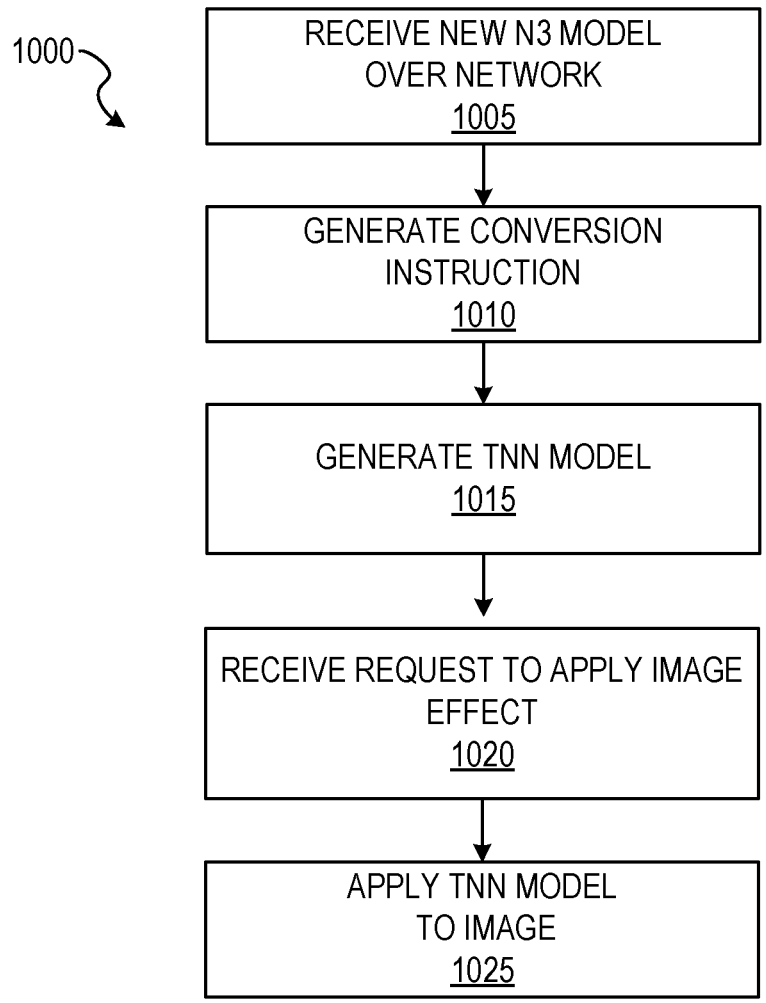
FIG. 10 shows an example flow diagram of a method for distribution of neural networks to client devices over a network, according to some example embodiments.

FIG. 10 shows an example flow diagram of a method 1000 for distribution of neural networks to client devices over a network, according to some example embodiments. At operation 1005, the interface engine 605 receives a new N3 model from a network server, e.g., from the training system 123 on application server 112. At operation 1010, in response to receiving the new N3 model, the interface engine 605 generates a conversion instruction, as discussed above. At operation 1015, the conversion engine 620 converts the N3 model to the TNN model. At operation 1020, the interface engine 605 receives a request to apply an image effect to an image. At operation 1025, the TNN model is applied to the image to generate a modified image.

Figure 11:
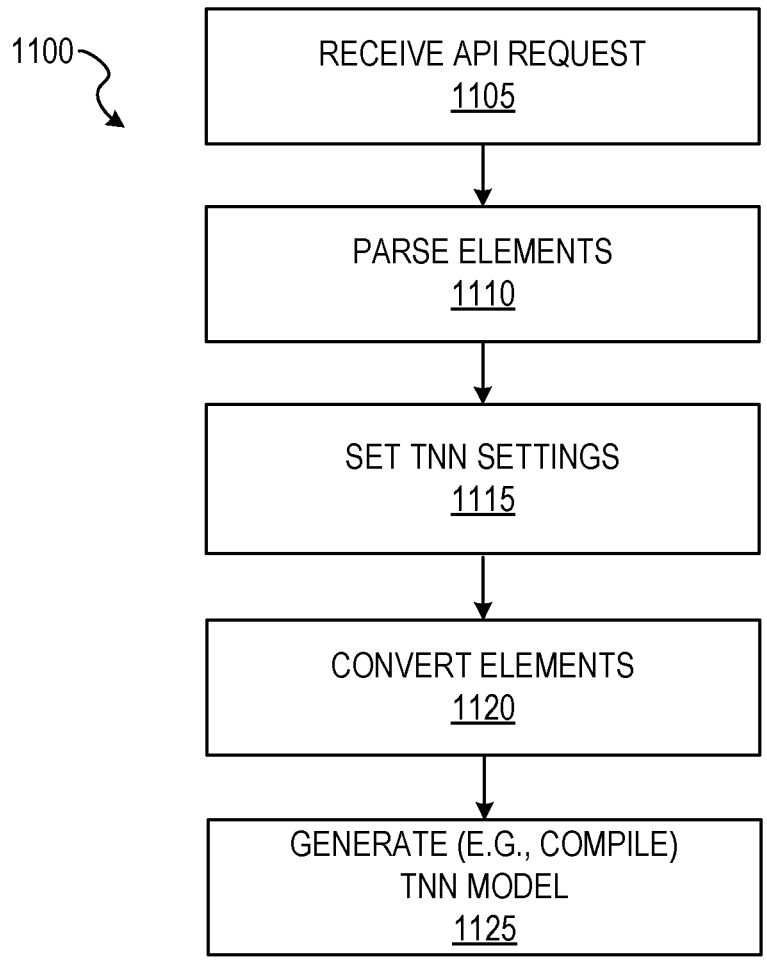
FIG. 11 shows an example flow diagram of a method generating a neural network model from another neural network model, according to some example embodiments.

FIG. 11 shows an example flow diagram of a method 1100 generating a TNN model from a N3 model, according to some example embodiments. At operation 1105, the conversion engine 620 receives an API request to initiate a conversion from a N3 model to a specified TNN model specified in the request. The API request may come from another engine within the remote converter 210 or another system executing on the client device 102, such as another application.

At operation 1110, the mapping engine 625 parses the N3 model to identify elements to map to elements of a TNN model, as discussed in further detail below with reference to FIG. 12.

At operation 1115, the mapping engine 625 sets different parameters than the N3 format uses. For example, the N3 model may use float16 values and the TNN model may use the more precise float32 or float64 values; thus at operation 1115 the TNN model is configured to use more precise format. Likewise, weights of the N3 model may be quantized or otherwise limited to 16 bits to preserve the small footprint of the N3 model; accordingly, at operation 1115 the TNN model is configured to use larger bit sized weights. Further, in some example embodiments, TNN models require declaration of certain values before the model is generated. For example, the input image size (the image generated at operation 705 of FIG. 7) can be specified at operation 1115.

At operation 1120, the conversion engine 620 converts each of the elements to the TNN format based on the mapping. In some example embodiments, the TNN model is created at operation 1120 when all the elements are converted using the mappings. However, according to some example embodiments, some TNN models (e.g., CoreML models) still must be compiled for execution via hardware acceleration. Thus, as according to some example embodiments, at operation 1125 the conversion engine 620 compiles the converted elements to generate the TNN model, according to some example embodiments.

Examples of code for performing method 1100 include:

```
::::::::::::::::::EXAMPLE 1 - BEGIN:::::::::::::::::
1 // Setup input and output params for the model conversion like
dimensions/layer names
2 InputParams inputParams(FastConvert::TensorShape(224, 224, 3) /* input
dimension */, "input_layer_name");
3 OutputParams outputParams({"out1", "out2"} /* output names */);
5 // Create model converter for your specific purpose. Ex: on ios you'd want
libdnn->coreml
6 ModelConverter converter(FastConvert::Backend::LIBDNN,
FastConvert::Backend::COREML);
7
8 // Convert the model
9 const std::string N3modelPath = "/path/to/N3.model"
10 std::string outputPath = "/path/to/output/TNN.coreml"
11 converter.Convert(N3modelPath, outputPath, inputParams, OutputParams);
12
13 // Perform any further processing as required on the TNN output model
14 std::string coreMLCompiled = FastConvert::CompileModel(outputPath);
15
16 // Run inference using FastConvert and the converted model
17 FastConvert::FastConvert network;
18 network.LoadModel(coreMLCompiled, "input_layer_name", {"out1",
"out2"}, FastConvert::Backend::Type::COREML);
19
20 // Wrap input image in FastConvert tensor
21 float *my_data_ptr = input.get_ptr( );
22 FastConvert::TensorShape data_shape(input.get_dimension( ));
23 auto tensor = FastConvert::Tensor::Wrap(my_data_ptr, data_shape);
24
25 // Run inference
26 auto outputTensorMap = network.Predict(tensor);
27
28 // Access inference result
```

-continued

```
29 auto result1 = outputTensorMap["out1"];
30 auto result2 = outputTensorMap["out2"];
:::::::::::::::::EXAMPLE 1 - END:::::::::::::::::
```

```
:::::::::::::::::EXAMPLE 2 - BEGIN:::::::::::::::::
1 #include <FastConvert/FastConvert.h>
2 void ConvertModel(std::string& inputPath, std::string& destPath)
3 {
4 FastConvert::ModelConversion::InputParams
inputParams(FastConvert::TensorShape(168, 96, 3), "image");
5 // To support models with multiple outputs, we need to specify the output
names in the format of std::v
6 FastConvert::ModelConversion:OutputParams outputParams({"prob"});
7 FastConvert::ModelConversion::ModelConverter
converter(FastConvert::Backend::N3, FastConvert::Backend::COREML);
8 // Input path is the path to the model file, e.g. /tmp/portrait.dnn
9 // DestPath is the path of the directory we want to save the model to, e.g
/tmp/outputModel.
10 converter.Convert(inputPath, destPath, inputParams, outputParams);
:::::::::::::::::EXAMPLE 2 - END:::::::::::::::::
```

Figure 12:
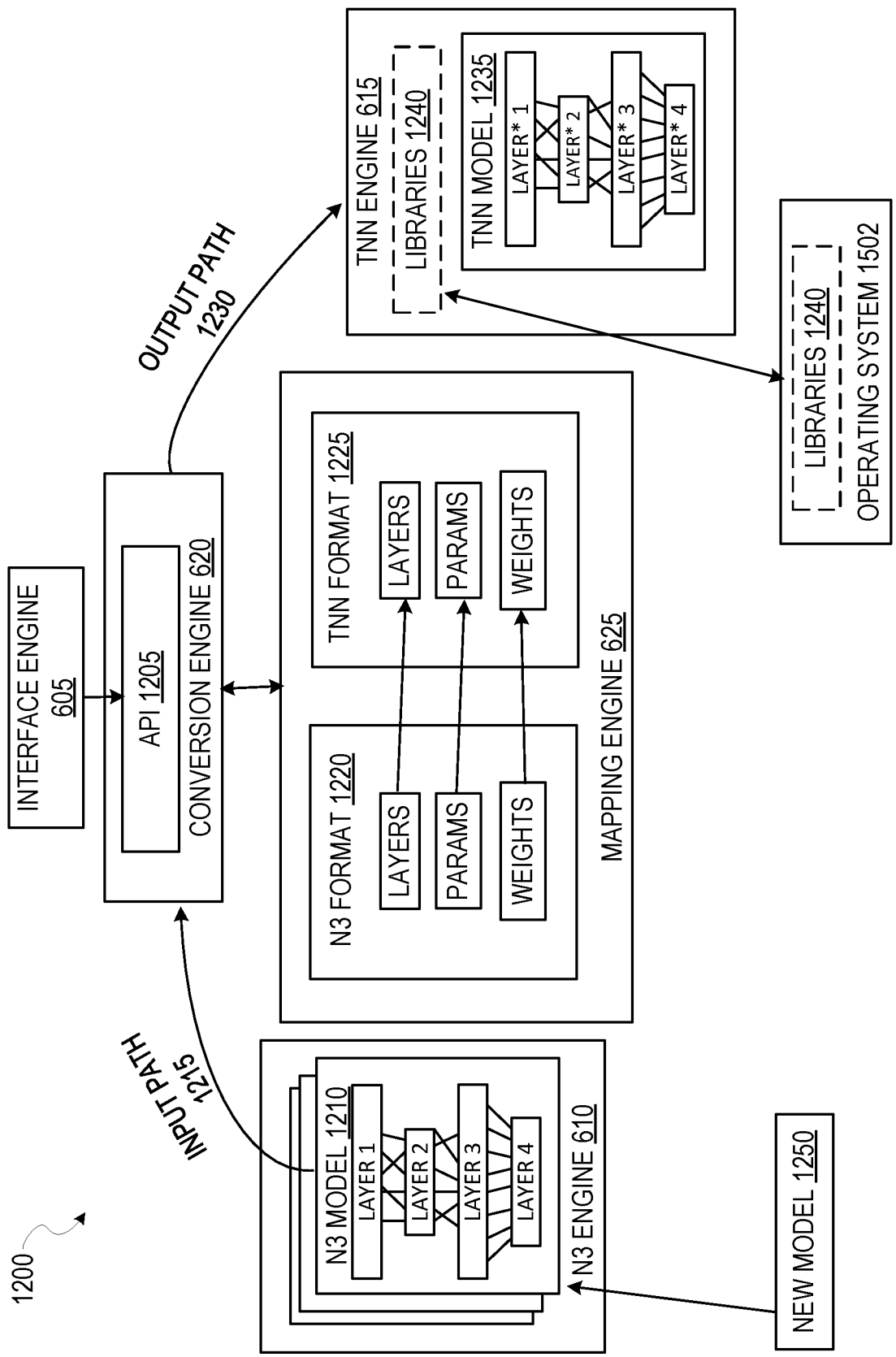
FIG. 12 shows an example architecture for implementing remote distribution of neural networks, according to some example embodiments.

FIG. 12 shows an example architecture for implementing remote distribution of neural networks, according to some example embodiments. As discussed above, the interface engine 605 can generate an instruction to convert an N3 model to a TNN model. The instruction is received by an API 1205 of the conversion engine 620. The conversion engine 620 uses the input path 1215 to locate the N3 model 1210. The mapping engine 625 is configured to parse the N3 model 1210 into its constituent parts, such as layers, ordering of layers, tensor size, N3 labels, etc. The mapping engine 625 maps each of the constituent parts of the N3 format 1220 to the TNN format 1225. The mapping can support mapping for different layers used in neural networks, including, for example: convolution, deconvolution, depth deconvolution, Relu, Prelu, Tanh, Pool, Eltwise, concatenation, Flatten, Permute, Reshape, Const, InnerProduct, Softmax, Batchnorm, Cropping nodes, Unpooling, Recurrent nodes, gated recurrent unit (GRU), LSTM layers, attention layers, and others.

The parameters can include data types used (e.g., size of floats), dimensions of the layers, ordering of the layers, additional information required by the TNN model 1235 (e.g., image size), and encryption and compression schemes. The weights are weights of the connections between layers of the deep neural networks. They can be generated via training on the server side for different tasks.

The conversion engine 620 can then construct the TNN model 1235 and store it in an output path 1230 specified by the instruction. The TNN model 1235 is executable on an operating system of the client device 102, such as operating system 1502 of FIG. 15. The operating system 1502 has libraries 1240 that may be used when the TNN model 1235 is being created or may be called by the TNN engine 615 when the TNN model 1235 is being applied to the input image.

Further, as new N3 models are created on the server side, they may be published and converted remotely on a plurality of different devices having different operating environments. For example, as illustrated in FIG. 12, a new N3 model 1250 can be transmitted over a network efficiently to the N3 engine 610 via the interface engine 605. In some example embodiments, the interface engine 605 generates an instruction to convert the new N3 model 1250 into the TNN format 1225 upon receiving the new N3 model 1250. Further in other example embodiments, the new N3 model 1250 may be converted when it becomes likely that the user will use the image effect for which the new N3 model 1250 was trained.

FIG. 13 shows an example user interface 1300 for triggering a remote model conversion process, according to some example embodiments. The user interface 1300 displays an image 1305 (e.g., a selfie) that depicts the user of the client device 102. User interface 1300 further displays a plurality of UI buttons 1310, —B1, B2, B3, B4, etc.—each of which can be configured to apply an image effect to the image 1305 of the user. Each of the image effects of the different UI buttons 1310 cause the messaging client application 104 to apply a neural network trained for a specific task to the image 1305 of the user. As discussed above, conversion and application of the neural network models to the image may be preemptively performed to enhance the users experience. For example, after the image 1305 generates the image, upon the image being displayed within the user interface 1300, the interface engine 605 may generate multiple instructions to convert all corresponding N3 models to TNN models.

Alternatively, in some embodiments, the conversion instruction is triggered in response to an increased likelihood that the user will select a given UI button of the plurality of UI buttons 1310. For example, the plurality of UI buttons 1310 may be operable as an icon carousel that can be swiped from right to left to display additional UI buttons that were previously off of the screen, e.g., B5, B6, B7. In response to receiving a scroll of the carousel, the interface engine 605 can trigger a model conversion instruction for a UI button that has yet to be displayed (e.g., B11). Thus, as the user scrolls a plurality of UI buttons 1310, a TNN model for the yet to be displayed button can be pre-generated and/or pre-applied to the image 1305, such that when the user selects the UI button, the resultant image is immediately displayed within the user interface 1300.

Figure 14A:
FIGS. 14A-14C illustrate example user interfaces for implementing multistage neural network processing, according to some example embodiments.
Figure 14B:
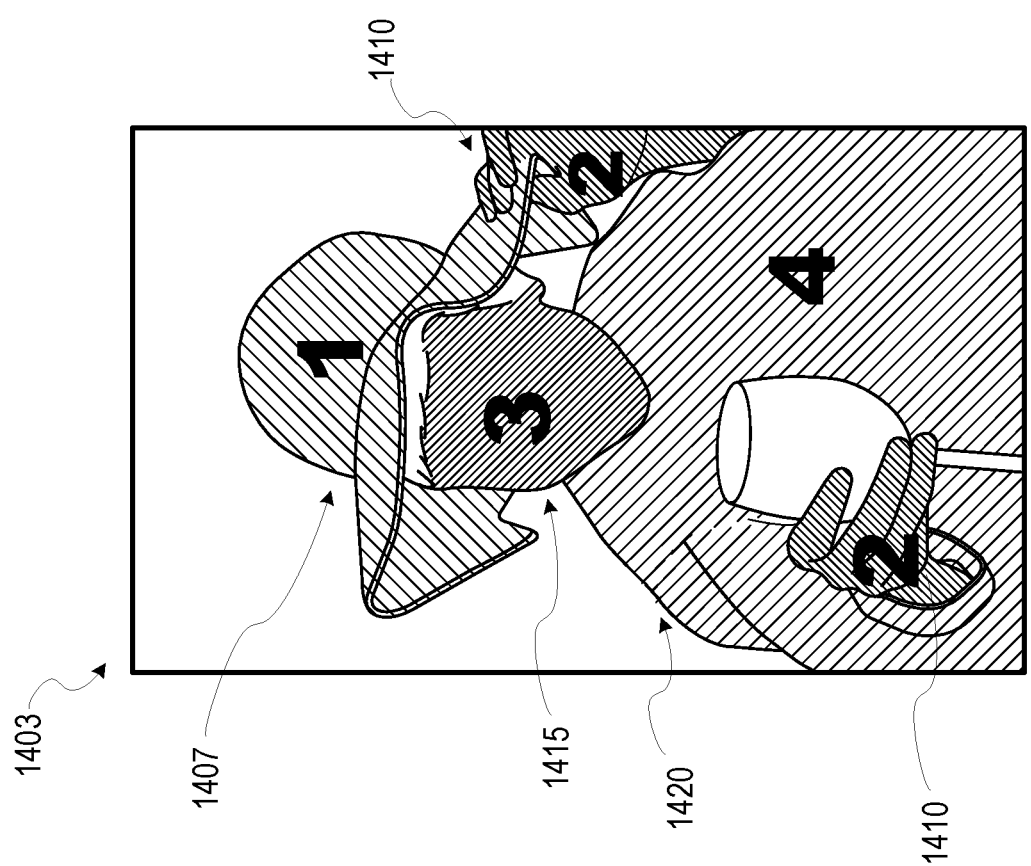
Figure 14C:

FIGS. 14A-C illustrate example user interfaces for implementing multistage neural network processing, according to some example embodiments. As illustrated in FIG. 14A, image 1400 is an example of an image captured at operation 705 of FIG. 7. The image 1400 depicts a smiling girl holding her hat and a tasty beverage. A user (e.g., the girl or another person holding a mobile phone taking a picture of the girl) may have selected button 1405 to initiate styling of the image 1400. An image mask may be required to perform the styling (e.g., the image mask is a mouth mask that labels pixels depicting the mouth area of the girl).

Responsive to selection of the button 1405, a TNN model is generated and applied to the image 1400, as discussed above. FIG. 14B shows a segmented image 1403, which has been generated by performing image segmentation on image 1400 using the TNN model. The image 1403 denotes different areas of the image, including for example a hat area 1407 (labeled "1"), skin areas that are not part of the face 1410 (labeled "2"), a face area 1415 (labeled "3"), and a clothes area 1420 (labeled "4"). The different label values may be included as channel data for each pixel (e.g., a fourth channel in addition to RGB (Red/Blue/Green) channels). Further, the label values may be stored as a separate image having the same height and width as image 1403.

FIG. 14C shows an example modified image 1425 which has undergone style transfer from a smile style to a frown style using an image mask (e.g., an eye area image mask, a mouth area image mask). In particular, for example, a second TNN configured to perform image style transfer can be converted and applied to the face area 1415 using the image mask. After the modified image 1425 is generated, it can be published to a network (e.g., published to a social network as an ephemeral message 502). In some example embodiments, both the TNN model to perform image segmentation and the TNN model to perform image style domain transfer are generated upon the image 1400 being displayed on the client device 102. Further, according to some example embodiments, both of the TNN models are generated on the fly only when the user selects button 1405, thereby saving network bandwidth and computational resources of the client device 102.

Figure 15:
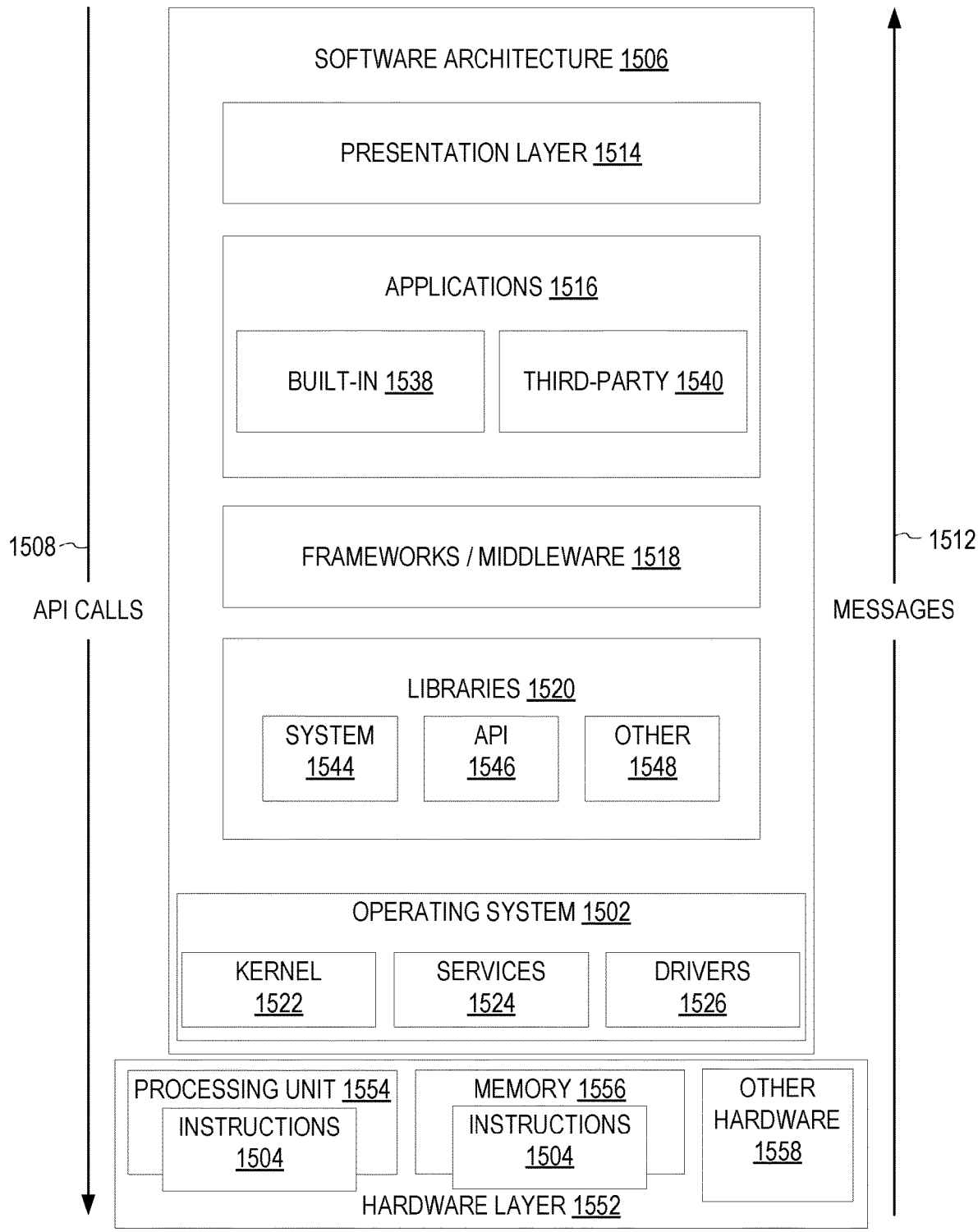
FIG. 15 is a block diagram illustrating a representative software architecture, which may be used in conjunction with various hardware architectures herein described.

FIG. 15 is a block diagram illustrating an example software architecture 1506, which may be used in conjunction with various hardware architectures herein described. FIG. 15 is a non-limiting example of a software architecture, and it will be appreciated that many other architectures may be implemented to facilitate the functionality described herein. The software architecture 1506 may execute on hardware such as a machine 1600 of FIG. 16 that includes, among other things, processors, memory, and I/O components. A representative hardware layer 1552 is illustrated and can represent, for example, the machine 1600 of FIG. 16. The representative hardware layer 1552 includes a processing unit 1554 having associated executable instructions 1504. The executable instructions 1504 represent the executable instructions of the software architecture 1506, including implementation of the methods, components, and so forth described herein. The hardware layer 1552 also includes a memory/storage 1556, which also has the executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, frameworks/middleware 1518, applications 1516, and a presentation layer 1514. Operationally, the applications 1516 and/or other components within the layers may invoke API calls 1508 through the software stack and receive a response in the form of messages 1512. The layers illustrated are representative in nature, and not all software architectures have all layers. For example, some mobile or special-purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522, services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1516 and/or other components and/or layers. The libraries 1520 provide functionality that allows other software components to perform tasks in an easier fashion than by interfacing directly with the underlying operating system 1502 functionality (e.g., kernel 1522, services 1524, and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1516 and other software components/modules.

The frameworks/middleware 1518 provide a higher-level common infrastructure that may be used by the applications 1516 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1516 and/or other software components/modules, some of which may be specific to a particular operating system 1502 or platform.

The applications 1516 include built-in applications 1538 and/or third-party applications 1540. Examples of representative built-in applications 1538 may include, but are not limited to, a contacts application, a browser application, a book reader application, a location application, a media application, a messaging application, and/or a game application. The third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as the operating system 1502) to facilitate functionality described herein.

The applications 1516 may use built-in operating system functions (e.g., kernel 1522, services 1524, and/or drivers 1526), libraries 1520, and frameworks/middleware 1518 to create user interfaces to interact with users of the system. Alternatively, or additionally, in some systems, interactions with a user may occur through a presentation layer, such as the presentation layer 1514. In these systems, the application/component "logic" can be separated from the aspects of the application/component that interact with a user.

Figure 16:
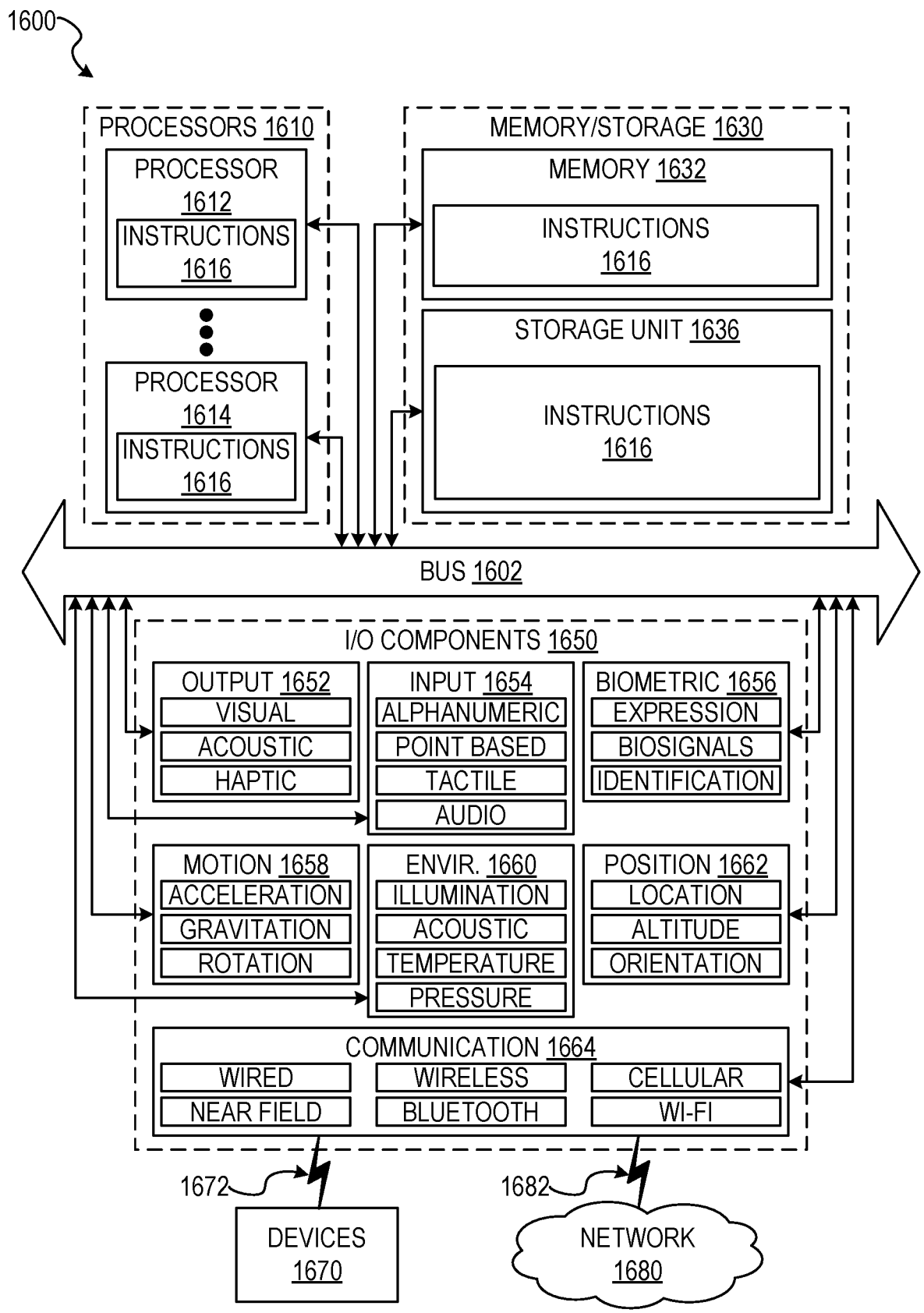
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. As such, the instructions 1616 may be used to implement modules or components described herein. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by the machine 1600. Further, while only a single machine 1600 is illustrated, the term "machine" shall also be taken to include a collection of machines that individually or jointly execute the instructions 1616 to perform any one or more of the methodologies discussed herein.

The machine 1600 may include processors 1610, memory/storage 1630, and I/O components 1650, which may be configured to communicate with each other such as via a bus 1602. The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor cache memory accessible to processors 1612 or 1614), or any suitable combination thereof, during execution thereof by the machine 1600.

Accordingly, the memory 1632, the storage unit 1636, and the memory of the processors 1610 are examples of machine-readable media.

The I/O components 1650 may include a wide variety of components to receive input, provide output, produce output, transmit information, exchange information, capture measurements, and so on. The specific I/O components 1650 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion, and the grouping is in no way limiting. In various example embodiments, the I/O components 1650 may include output components 1652 and input components 1654. The output components 1652 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environment components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1658 may include acceleration sensor components (e.g., accelerometer), gravitation sensor components, rotation sensor components (e.g., gyroscope), and so forth. The environment components 1660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1662 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via a coupling 1682 and a coupling 1672, respectively. For example, the communication components 1664 may include a network interface component or other suitable device to interface with the network 1680. In further examples, the communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a USB).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1664, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1616 for execution by the machine 1600, and includes digital or analog communications signals or other intangible media to facilitate communication of such instructions 1616. Instructions 1616 may be transmitted or received over the network 1680 using a transmission medium via a network interface device and using any one of a number of well-known transfer protocols.

"CLIENT DEVICE" in this context refers to any machine 1600 that interfaces to a network 1680 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1680.

"COMMUNICATIONS NETWORK" in this context refers to one or more portions of a network 1680 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1680 may include a wireless or cellular network, and the coupling 1682 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1616 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions 1616 (e.g., code) for execution by a machine 1600, such that the instructions 1616, when executed by one or more processors 1610 of the machine 1600, cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1612 or a group of processors 1610) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1600) uniquely tailored to perform the configured functions and are no longer general-purpose processors 1610. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1612 configured by software to become a special-purpose processor, the general-purpose processor 1612 may be configured as respectively different special-purpose processors (e.g., comprising different hardware components) at different times. Software accordingly configures a particular processor 1612 or processors 1610, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1610 that are temporarily configured (e.g., by software) or permanently configured to perform the relevant operations. Whether temporarily or permanently configured, such processors 1610 may constitute processor-implemented components that operate to perform one or more operations or functions described herein. As used herein, "processor-implemented component" refers to a hardware component implemented using one or more processors 1610. Similarly, the methods described herein may be at least partially processor-implemented, with a particular processor 1612 or processors 1610 being an example of hardware. For example, at least some of the operations of a method may be performed by one or more processors 1610 or processor-implemented components. Moreover, the one or more processors 1610 may also operate to support performance of the relevant operations in a "cloud computing" environment or as a "software as a service" (SaaS). For example, at least some of the operations may be performed by a group of computers (as examples of machines 1600 including processors 1610), with these operations being accessible via a network 1680 (e.g., the Internet) and via one or more appropriate interfaces (e.g., an API). The performance of certain of the operations may be distributed among the processors 1610, not only residing within a single machine 1600, but deployed across a number of machines 1600. In some example embodiments, the processors 1610 or processor-implemented components may be located in a single geographic location (e.g., within a home environment, an office environment, or a server farm). In other example embodiments, the processors 1610 or processor-implemented components may be distributed across a number of geographic locations.

"PROCESSOR" in this context refers to any circuit or virtual circuit (a physical circuit emulated by logic executing on an actual processor 1612) that manipulates data values according to control signals (e.g., "commands," "op codes," "machine code," etc.) and which produces corresponding output signals that are applied to operate a machine 1600. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1610 may further be a multi-core processor 1610 having two or more independent processors 1612, 1614 (sometimes referred to as "cores") that may execute instructions 1616 contemporaneously.

"TIMESTAMP" in this context refers to a sequence of characters or encoded information identifying when a certain event occurred, for example giving date and time of day, sometimes accurate to a small fraction of a second.

What is claimed is:
1. A method comprising:
 detecting, from a device, a triggering event of a neural network conversion process associated with an image effect;
 identifying, by one or more hardware processors, a native neural network model associated with the image effect;
 converting the native neural network model to a target neural network model based on computational resources associated with the device;

in response to converting the native neural network model to a target native neural network model, causing display of user interface element associated with the image effect on a user interface of the device; and generating a modified image by applying the target neural network model to an image.

2. The method of claim 1, wherein the triggering event of the neural network conversion process comprises an application event that corresponds to any one of: navigation to a pre-specified user interface or activation of a messaging client application associated with the device.

3. The method of claim 1, comprising:
determining the target neural network model based on an operating system associated with the device having libraries for parallel execution of neural networks on a plurality of hardware processors.

4. The method of claim 3, wherein the target neural network model is associated with input parameters that are not included in the native neural network model.

5. The method of claim 1, comprising:
identifying computational hardware of the device; and
modifying a size of the image to an input image size based on an identified computational hardware of the device.

6. The method of claim 1, comprising:
specifying a plurality of input parameters of the target neural network model; and
compiling the target neural network model using the plurality of input parameters.

7. The method of claim 6, wherein the plurality of input parameters includes a first input parameter corresponding to an input image size of the image.

8. The method of claim 1, wherein the computational resources associated with the device comprises one or more of: a screen size, bandwidth quality, GPU availability, one or more hardware acceleration libraries, multi-core parallel processing capability on a CPU, and multi-core concurrent processing capability on the CPU.

9. The method of claim 1, comprising:
receiving usage data from the device; and
identifying the native neural network model associated with the image effect based on the usage data.

10. The method of claim 9, wherein the usage data comprises frequency statistics of neural network model conversion.

11. A system comprising:
a memory storing instructions; and
one or more hardware processors communicatively coupled to the memory and configured by the instructions to perform operations comprising:
detecting, from a device, a triggering event of a neural network conversion process associated with an image effect;
identifying a native neural network model associated with the image effect;
converting the native neural network model to a target neural network model based on computational resources associated with the device;
in response to converting the native neural network model to a target native neural network model, causing display of user interface element associated with the image effect on a user interface of the device; and
generating a modified image by applying the target neural network model to an image.

12. The system of claim 11, wherein the triggering event of the neural network conversion process comprises an application event that corresponds to any one of: navigation to a pre-specified user interface or activation of a messaging client application associated with the device.

13. The system of claim 11, wherein the operations comprise:
determining the target neural network model based on an operating system associated with the device having libraries for parallel execution of neural networks on a plurality of hardware processors.

14. The system of claim 13, wherein the target neural network model is associated with input parameters that are not included in the native neural network model.

15. The system of claim 11, wherein the operations comprise:
identifying computational hardware of the device; and
modifying a size of the image to an input image size based on an identified computational hardware of the device.

16. The system of claim 11, wherein the operations comprise:
specifying a plurality of input parameters of the target neural network model; and
compiling the target neural network model using the plurality of input parameters.

17. The system of claim 16, wherein the plurality of input parameters includes a first input parameter corresponding to an input image size of the image.

18. The system of claim 11, wherein the computational resources associated with the device comprises one or more of: a screen size, bandwidth quality, GPU availability, one or more hardware acceleration libraries, multi-core parallel processing capability on a CPU, and multi-core concurrent processing capability on the CPU.

19. The system of claim 11, wherein the operations comprise:
receiving usage data from the device; and
identifying the native neural network model associated with the image effect based on the usage data.

20. A non-transitory machine-readable storage medium comprising instructions that, when executed by a processing device, cause the processing device to perform operations comprising:
detecting, from a device, a triggering event of a neural network conversion process associated with an image effect;
identifying a native neural network model associated with the image effect;
converting the native neural network model to a target neural network model based on computational resources associated with the device;
in response to converting the native neural network model to a target native neural network model, causing display of user interface element associated with the image effect on a user interface of the device; and
generating a modified image by applying the target neural network model to an image.

* * * * *